3,027,264
PREPARATION OF DEHYDRATED COOKED MASHED POTATO PRODUCT
Theodore F. Irmiter and George Rubin, Little Falls, N.Y., assignors to Salada-Shirriff-Horsey Ltd., Don Mills, Ontario, Canada
No Drawing. Filed Nov. 6, 1959, Ser. No. 851,266
5 Claims. (Cl. 99—207)

This invention relates to improvements in dehydrated cooked mashed or riced potatoes.

According to presently known processes, for example, the processes disclosed in United States Patent No. 2,759,832 and United States Patent No. 2,780,552, dated February 5, 1957, both granted to James Cording, Jr., and Miles J. Willard, Jr., cooked mashed potatoes can be dehydrated to form a product which can be quickly and easily reconstituted to yield mashed potato having substantially the colour, flavour and consistency of fresh mashed potato with the result that dehydrated cooked mashed potato is enjoying a rapidly expanding market. It has, however, been found that such present dehydration processes result in an appreciable loss in the nutritional values present in fresh potatoes. In particular, it has been found that present dehydration processes result in a serious loss of the vitamin content of fresh potatoes and in the case of vitamin C, for which potatoes are looked upon as an important source, the loss is approximately 80% of the vitamin C found in freshly dug potatoes.

It is the principal object of the present invention to provide a dehydrated cooked mashed or riced potato product which will have a nutritional value substantially equal to freshly dug potatoes. In particular it is an important object to provide a dehydrated cooked mashed or riced potato which will have a vitamin C content level at least equal to fresh potatoes.

It is, of course, an implicit object of the invention to provide a dehydrated cooked potato product having such enhanced nutritional value as aforesaid without in any way sacrificing the present desirable characteristics of dehydrated cooked mashed potatoes such as, for instance, are produced in accordance with the process disclosed in said United States Patents Nos. 2,759,832 and 2,780,552.

Another important object is to provide a dehydrated cooked potato product which, in addition to having enhanced nutritional value, may also incorporate other additives as desired.

While it has been desirable to include additives in dehydrated cooked mashed or riced potatoes, it has been found that when the additives, particularly the most important desired additive vitamin C, are incorporated, the quality of the resulting product is adversely affected. In particular, it has been found that the flavour is adversely affected and the resulting product is not consistent either in flavour or texture. In addition, it has been found that there is a loss of the additives upon storage of the product. Again in particular with respect to vitamin C, in the past it has not been possible to maintain an adequate concentration of the additive under storage conditions approximating normal product shelf life.

According to the present invention, however, it is now possible to incorporate additives in dehydrated cooked mashed or riced potatoes (hereinafter called dehydrated cooked mashed potatoes) without any deleterious effects on the flavour, texture or colour of the product, and further to maintain the desired level of additive concentration in the end product throughout the normal shelf life of the product.

In the preparation of dehydrated cooked mashed potatoes, it has been found desirable to add to the potato used to produce the end product an anti-oxidant to preserve the requisite potato flavour, an emulsifier to improve the texture of the dehydrated product, and sulphites to further preserve flavour and to preserve colour, and in particular to prevent browning of the end dehydrated product in storage. However, attempts to simply incorporate additives, and again in particular vitamin C, into the product with the anti-oxidant, emulsifier, and sulphites have resulted in the upsetting of the functioning, particularly of the emulsifier and anti-oxidants so that they are no longer capable of providing the high quality and consistent flavour and texture in the end product with the result that it has not heretofore been practical to even restore to the dehydrated cooked mashed potato product the vitamin C lost in the dehydration process and for which potatoes may be relied upon.

It has now been found, however, according to the present invention, that additives, particularly vitamin C, can be added or restored to dehydrated cooked mashed potatoes by incorporating the additive into a sulphite solution and feeding the sulphite solution into the potato mash separately from the anti-oxidant and emulsifiers, whereby it has been found that the additives cannot interact with the anti-oxidant and emulsifiers to upset their intended function, and at the same time the sulphites are maintained at the requisite additive level.

To establish the loss of vitamin C in the production of dehydrated cooked mashed potatoes according to present processes as set forth in said patents, and as outlined in a further paper by James Cording, Jr., et al., entitled "Advances in the Dehydration of Mashed Potatoes by the Flake Process," from Food Technology, 1957, vol. XI, No. 4, pages 236–240, 5 pounds of Russet Burbank potatoes were peeled and trimmed, then sliced into ½ inch slices and precooked in water for 20 minutes at 160° F. Following the pre-cooking, the potatoes were then cooked in a pressure cooker or autoclave for 10 minutes at 15 p.s.i. and mashed.

Following cooking, the mashed potatoes were dried with a double drum drier with the drums operated at a steam pressure of 60 p.s.i. and a drum speed of 4 r.p.m. with the potatoes being dried with the requisite substantially monocellular film thickness to prevent excessive cell rupture and yet to provide a product which will reconstitute almost instantly. The resulting moisture content of the dried potato flakes was found to be 6.4%. The vitamin C content of the resulting dehydrated cooked mashed potatoes was found to be 12.3 mg. per 100 gm. dried flakes. Raw potatoes of the type used in the process were measured to determine their vitamin C level, and it was found that these potatoes contained 11.3 mg. of vitamin C per 100 gm. potatoes. If no losses of vitamin C occurred in the process to produce dehydrated cooked mashed potatoes, these potatoes in the dehydrated form would have a vitamin C level of 50.5 mg. per 100 gm. of dehydrated potato instead of the actual vitamin level of 11.3 mg. determined on measurement.

It will therefore be seen that 78% of the natural vitamin C occurring in the raw potatoes was lost in processing to prepare the dehydrated cooked mashed potato product.

While on an experimental basis it was possible to restore the lost vitamin C by incorporating into the product a vitamin C additive, when it came to practical commerial manufacture where it is desirable to incorporate into the product an anti-oxidant, such as are commercially available and for example a mixture of butylated hydroxy anisole, butylated hydroxy toluene and corn oil to improve the flavour of the product, and an emulsifier such as glycerolmonopalmitate to aid in the incorporation of the anti-oxidant and to improve the product texture, it was found that the vitamin C could not be incorporated without impairing both the flavour and texture of the product. The use of sulphites was also resorted to to aid in the preservation of the flavour, but despite such additions, an acceptable product could not be obtained when the vitamin C was added into the product. In the investigations it was discovered that the vitamin C appeared to have the effect of precipitating out the emulsifier with the result that the emulsifier could not be uniformly dispersed throughout the product during preparation. Further, as a result of such random concentration of the emulsifier, it was found that the anti-oxidant also could not be uniformly dispersed throughout the product, with the result that here would occur random concentrations of the emulsifier and anti-oxidant which upset the flavour and left the product with a non-uniform texture. The addition of the sulphites, e.g. sodium sulphite and sodium bisulphite, failed to alleviate the problem.

Moreover it was found that although sufficient vitamin C was added to restore the natural vitamin C of the raw potatoes lost in the dehydrated product, the level of the vitamin C in the product decayed relatively rapidly in storage.

It was for the present invention to discover that vitamin C could be added to dehydrated cooked mashed potatoes to restore the vitamin C level to the equal of that present in freshly dug potatoes without the problems of impairment of flavour and texture if the vitamin C was added to the potato mash prior to drying at a point separate from the emulsifiers and anti-oxidant, and more particularly it was found that if the vitamin C was mixed with the sulphites, not only could the vitamin C be isolated from effecting the apparent precipitation of the emulsifiers and anti-oxidant, but further the sulphites were found to retard the rate of vitamin C loss in storage so that the requisite vitamin C level in the end product could be maintained throughout the maximum shelf life to which the product would be subjected.

In addition to the enhanced nutritional value occasioned by the incorporation of the vitamin C in the product as aforesaid, the product can be further enhanced if there is incorporated into the potato mash as an additive prior to drying a quantity of non-fat dry milk solids which result in an improvement in colour in the product and which render the resulting potato flakes more opaque.

In addition to the ability to incorporate vitamin C into the product without adverse effects it was also found possible to incorporate other additives such as vitamin $B_2$ and niacin without adverse effect on the flavour, colour and texture of the product providing the emulsifiers and anti-oxidant were delivered into the potato mash to a point separate from the sulphites, and the vitamin C when added was incorporated into the mash admixed with the sulphites. It has also been found that the fat soluble vitamins such as vitamin A, vitamin D, vitamin E and vitamin K can be successfully incorporated providing they are admixed with the emulsifier prior to addition to the mash. Thus the present invention has not only enabled the naturally occurring nutritional values of freshly dug raw potatoes to be restored but further has enabled additional nutritional values to be incorporated into a dehydrated cooked mashed potato.

A typical application of the invention is illustrated by the following example.

As before, five pounds of Russet Burbank potatoes were peeled and trimmed and then sliced into slices approximately one-half inch thick and blanched in water for 20 minutes at 160° F. Following pre-cooking, they were cooked in the autoclave or pressure cooker for 6 to ten minutes with the pressure cooker operated at a steam pressure of fifteen pounds p.s.i. Following cooking, the potatoes were mashed, then according to the invention there was added to the mash 17.5 cc. of the following additives in the following proportions:

| | |
|---|---|
| Emulsifier, glycerolmonopalmitate, gms | 0.8488 |
| Anti-oxidant gms | 0.7377 |
| Non-fat dry milk solids (instant milk powder) gms | 1.6997 |
| Sodium sulphite gms | 0.5543 |
| Sodium bi-sulphite gms | 0.1794 |
| Water cc | 7.90 |
| Vitamin C gms | 1.58 |

The emulsifier, anti-oxidant and non-fat dry milk solids were mixed into the mash separately from the sodium sulphite and sodium bisulphite into which were incorporated the vitamin C.

Following the mixing of the additives into the mash, the mash was again dried in a double drum atmospheric drier operating at a steam pressure of 60 lbs. p.s.i. and at a speed of 4 r.p.m. Following drying the moisture content of the resulting flakes was measured and was found to be 5.5%. The vitamin C content was also measured and was found to be 168.7 mg. per 100 gms. of dried flakes.

To reconstitute the dried potato flakes into the table product, 86 gms. of flakes are added to one-half cup milk, ½ cups boiling water and one tablespoon butter, to produce four normal servings of potatoes. Therefore, translating the vitamin C content of the potato flakes into the required vitamin C level for one serving of fresh cooked mashed potatoes, the vitamin C level required in the flakes is 167 mg. of 100 gms. of flakes. In the example given above, the vitamin C content actually measured in the flakes was 168 mg. per 100 gms. of dried flakes, so that it will be seen that the vitamin C level was fully restored.

It will be appreciated that specific quantities set out in the above example are given for effecting 100% recovery of the natural recurring vitamin C normally lost in the processing of fresh potatoes to produce dehydrated cooked mashed potatoes.

Should it be desired that additional vitamin C be incorporated or should something less than 100% recovery be acceptable, then it will be understood that the specific quantities and proportions of the additives may be varied accordingly.

In addition to the incorporation of the additives mentioned in the above example, it will be understood that it is also possible to introduce into the mash, other additives such as riboflavin (vitamin $B_2$), and niacin, and also as stated above one or more of the fat soluble vitamins such as vitamin A, vitamin D, vitamin E, and vitamin K, provided the latter are admixed with the emulsifier prior to its addition to the mash.

The sulphites ($Na_2SO_3$, $NaHSO_3$), whose function is to preserve flavour and colour and to prevent browning on storage, especially at high temperature, appear to provide a protective mechanism enabling the requisite level of vitamin C to be maintained for the expected shelf life of the product.

The milk powder is desirable both to improve the colour of the product and also to make the product more opaque, but may be omitted without adversely effecting the vitamin C content of the end product.

While the invention is directed particularly to restoring the vitamin C level of raw potatoes in the end product, it will be understood that in broader terms it is directed to the incorporation of nutritional additives to dehydrated cooked mashed potatoes, such additives are within the scope of the invention and appended claims.

What we claim as our invention is:

1. In the preparation of dehydrated cooked mashed potatoes, the steps of pre-cooking peeled and sliced raw potatoes, then cooking and mashing such pre-cooked raw potatoes, then adding to the mash vitamin C, an emulsifier and an anti-oxidant while isolating the vitamin C from precipitating out said emulsifier and anti-oxidant, said latter step being carried out by adding to said mash at separate points one solution comprising vitamin C, sodium sulphite, sodium bi-sulphite and water and another solution comprising an emulsifier, an anti-oxidant and water, then drying the resulting mixture to flake form.

2. The preparation of dehydrated cooked mashed potatoes as claimed in claim 1 in which there is also added to said mash as a constituent of said other solution non-fat dry milk solids.

3. The preparation of dehydrated cooked mashed potatoes as claimed in claim 2 in which said first mentioned solution comprises substantially:

|  | Gms. |
|---|---|
| Sodium sulphite | 0.55 |
| Sodium bi-sulphite | 0.18 |
| Vitamin C | 1.60 | and said second mentioned other solution comprises substantially:

|  | Gms. |
|---|---|
| Emulsifier | 0.85 |
| Non-fat dry milk solids | 1.70 |
| Anti-oxidant | 0.74 | per five pounds of uncooked, peeled potato slices.

4. A method of incorporating vitamin C into dehydrated cooked mashed potatoes containing an emulsifier and an anti-oxidant comprising cooking and mashing potatoes, adding to the potato mash at one point a solution of an emulsifier and an anti-oxidant, forming a separate solution of vitamin C and sulphites to isolate said vitamin C from precipitating said emulsifier and anti-oxidant out of the mash, and adding said separate solution of vitamin C and sulphites to said mash at a point separately from said emulsifier and anti-oxidant solution, and then drying said mash.

5. A method of incorporating vitamin C into dehydrated cooked mashed potatoes containing an emulsifier, non-fat milk solids, and an anti-oxidant comprising cooking and mashing potatoes, adding to the potato mash at one point a solution of an emulsifier, non-fat milk solids, and an anti-oxidant, forming a separate solution of vitamin C and sulphites to isolate said vitamin C from precipitating said emulsifier and anti-oxidant out of the mash, and adding said separate solution of vitamin C and sulphites to said mash at a point separately from said emulsifier, non-fat milk solids, and anti-oxidant solution, then drying the admixture to flake form.

References Cited in the file of this patent
UNITED STATES PATENTS

| 2,572,762 | Rivoche | Oct. 23, 1951 |
| 2,705,679 | Griffiths et al. | Apr. 5, 1955 |
| 2,798,815 | Medriczky | July 9, 1957 |

OTHER REFERENCES

"Potato Processing," Talburt et al., copyright April 23, 1959, The Avi Publishing Co., Inc. (Westport), pp. 201, 332 to 336.

"Food Technology," April 1957, pp. 236, 237.